United States Patent
Nakanishi et al.

(10) Patent No.: US 11,609,844 B2
(45) Date of Patent: Mar. 21, 2023

(54) MEMORY SYSTEM WITH HIERARCHICAL TABLES

(71) Applicant: KIOXIA CORPORATION, Tokyo (JP)

(72) Inventors: Keiri Nakanishi, Kawasaki Kanagawa (JP); Konosuke Watanabe, Kawasaki Kanagawa (JP); Kohei Oikawa, Kawasaki Kanagawa (JP); Daisuke Iwai, Yokohama Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 0 days.

(21) Appl. No.: 16/806,173

(22) Filed: Mar. 2, 2020

(65) Prior Publication Data
US 2021/0064524 A1    Mar. 4, 2021

(30) Foreign Application Priority Data
Sep. 3, 2019 (JP) .............................. JP2019-160660

(51) Int. Cl.
G06F 12/02 (2006.01)
G06F 13/16 (2006.01)

(52) U.S. Cl.
CPC ........ *G06F 12/023* (2013.01); *G06F 12/0246* (2013.01); *G06F 12/0292* (2013.01); *G06F 13/1668* (2013.01); *G06F 2212/401* (2013.01); *G06F 2212/7201* (2013.01); *G06F 2212/7209* (2013.01)

(58) Field of Classification Search
None
See application file for complete search history.

(56) References Cited

U.S. PATENT DOCUMENTS

| | | | |
|---|---|---|---|
| 5,696,927 A * | 12/1997 | MacDonald | G06F 12/1009 710/68 |
| 9,880,762 B1 | 1/2018 | Armangau et al. | |
| 9,946,462 B1 * | 4/2018 | Li | G06F 12/0871 |
| 2013/0246689 A1 | 9/2013 | Matsudaira et al. | |
| 2016/0092371 A1 * | 3/2016 | Shanbhogue | G06F 12/1009 711/207 |
| 2018/0239547 A1 | 8/2018 | Inbar et al. | |
| 2018/0356998 A1 | 12/2018 | Wu et al. | |
| 2018/0357268 A1 | 12/2018 | Hof et al. | |
| 2019/0018788 A1 | 1/2019 | Yoshida et al. | |
| 2019/0042111 A1 | 2/2019 | Garcia et al. | |

FOREIGN PATENT DOCUMENTS

| | | |
|---|---|---|
| JP | 2013-196115 A | 9/2013 |
| JP | 2019-020788 A | 2/2019 |

* cited by examiner

*Primary Examiner* — Charles Rones
*Assistant Examiner* — Ryan Dare
(74) *Attorney, Agent, or Firm* — Foley & Lardner LLP

(57) ABSTRACT

A memory system includes a first memory that is nonvolatile, a second memory that is volatile, and a memory controller. The memory controller is configured to store first information in the second memory. The first information includes management information. The memory controller is further configured to compress the first information. The compressed first information is second information. The memory controller is configured to store the second information in the first memory.

13 Claims, 11 Drawing Sheets

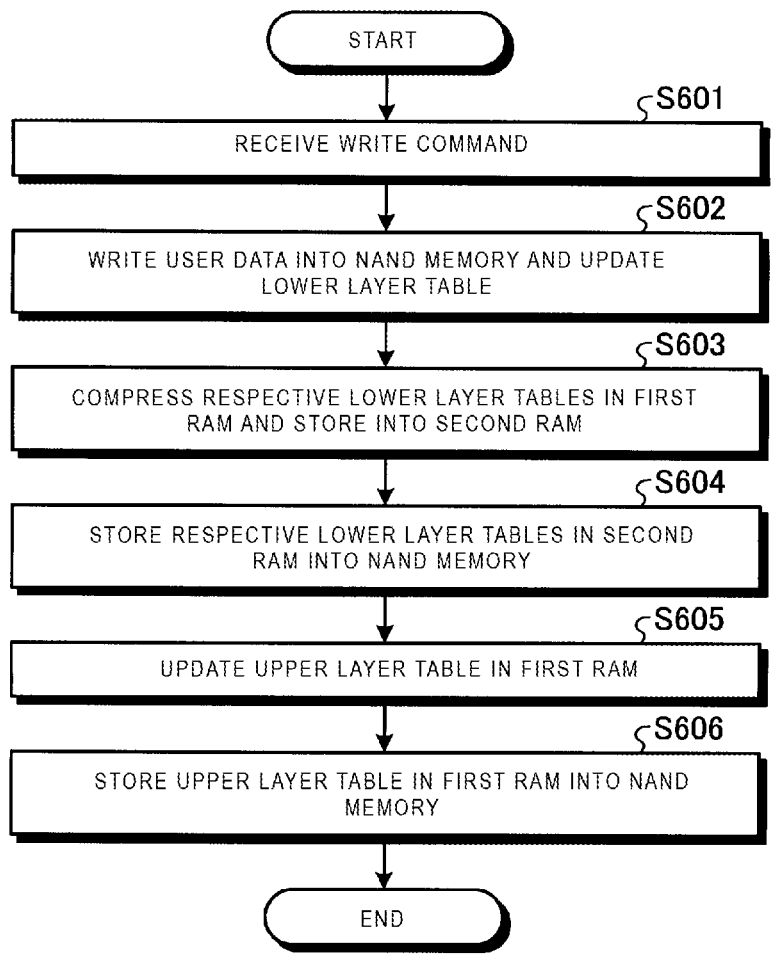

MEMORY SYSTEM WITH HIERARCHICAL TABLES

CROSS-REFERENCE TO RELATED APPLICATION(S)

This application is based upon and claims the benefit of priority from Japanese Patent Application No. 2019-160660, filed Sep. 3, 2019, the entire contents of which are incorporated herein by reference.

FIELD

Embodiments described herein relate generally to a memory system.

BACKGROUND

As a memory system, a Solid State Drive (SSD) including a NAND flash memory (hereinafter referred to as a NAND memory) is known. In a memory system such as the SSD, a larger amount of data than an amount of user data actually received from a host is written into the NAND memory. A ratio of a total amount of data actually written in the NAND memory to the amount of user data received from the host is known as a write amplification factor (WAF). A mechanism for reduction of WAF is desired in order to reduce a progress speed of wear of an NAND memory.

Examples of related art include US Patent Application Publication Number 2018/0239547 Specification.

DESCRIPTION OF THE DRAWINGS

FIG. 13 is a flowchart showing an example of an operation to non-volatilize the management information, which is executed by the memory system according to the third embodiment.

DETAILED DESCRIPTION

Embodiments provide a memory system in which a write amplification factor is reduced.

In general, according to one embodiment, a memory system includes a first memory that is nonvolatile, a second memory that is volatile, and a memory controller. The memory controller is configured to store first information in the second memory. The first information includes management information. The memory controller is further configured to compress the first information. The compressed first information is second information. The memory controller is configured to store the second information in the first memory.

Hereinafter, a memory system according to an embodiment will be described in detail with reference to attached drawings. The present disclosure is not limited to the following embodiments.

First Embodiment

Figure 1:
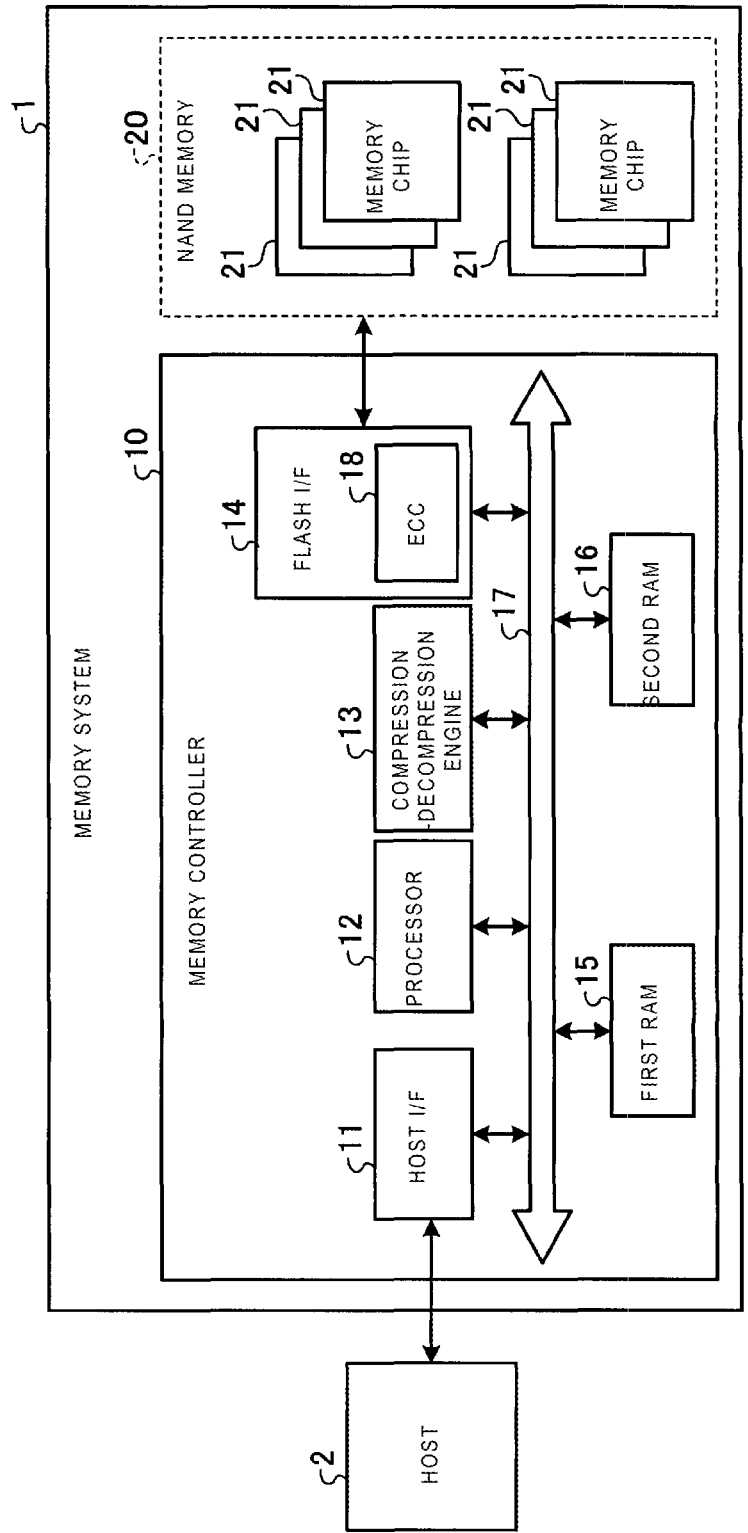
FIG. 1 is a schematic diagram showing a configuration example of a memory system according to an embodiment.

FIG. 1 is a schematic diagram showing a configuration example of a memory system according to an embodiment. A memory system 1 is connected to a host 2 via a communication path. The host 2 is, for example, a computer. Examples of the computer include a personal computer, a portable computer, a mobile communication device, or the like.

The memory system 1 functions as an external storage device of the host 2. The host 2 can issue an access command (a write command and a read command) to the memory system 1. The access command includes a logical address indicating a location of an access destination.

The logical address is location information indicating a position in a logical address space provided by the memory system 1 to the host 2. A logical address is assigned to each predetermined unit area of the logical address space. In one example, the logical address is assigned to each sector of the logical address space. A unit of assignment of the logical address is not limited to a sector.

The memory system 1 includes a memory controller 10 and an NAND flash memory (NAND memory) 20 which is used as a storage. A type of a memory used as the storage is not limited to the NAND flash memory only. Any type of nonvolatile memory may be employed as the storage. For example, an NOR flash memory, a Resistance Random Access Memory (ReRAM), or a Magnetoresistive Random Access Memory (MRAM) may be employed.

The memory controller 10 receives the access command including designation of a logical address from the host 2. Then, the memory controller 10 executes data transmission between the host 2 and the NAND memory 20 in accordance with the received access command.

The NAND memory 20 may be configured with one or more memory chips 21. In this example, the NAND memory 20 includes six memory chips 21.

Figure 2:
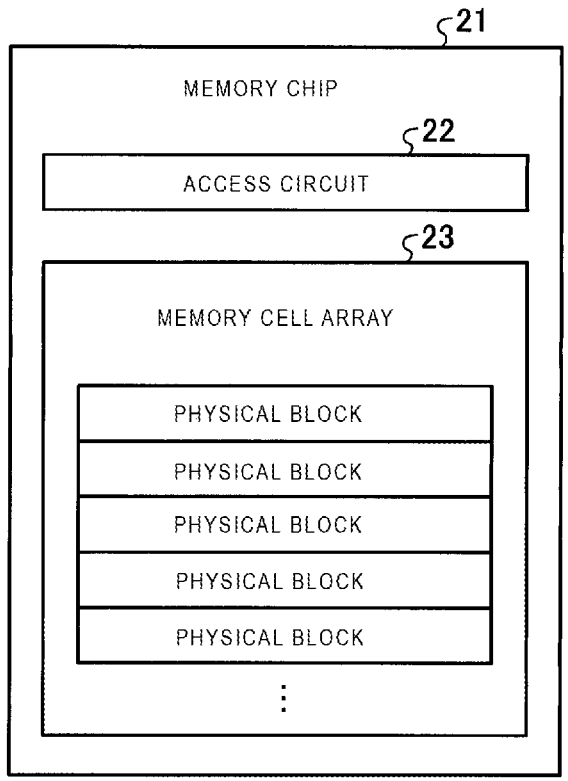
FIG. 2 is a schematic diagram showing a configuration example of each memory chip.

FIG. 2 is a schematic diagram showing a configuration example of each memory chip 21. Each of the memory chips 21 includes an access circuit 22 and a memory cell array 23, respectively.

The access circuit 22 includes a row decoder, a column decoder, a sense amplifier, a voltage generation circuit, a sequencer, a data buffer, and the like. The access circuit 22 can execute programming (writing) of data, reading of data, and erasing of data with respect to the memory cell array 23.

The memory cell array 23 has a configuration in which a plurality of memory cells are arranged two-dimensionally or three-dimensionally. The memory cell array 23 includes a plurality of physical blocks. The physical block is a unit of erasing with respect to the memory cell array 23. That is, entire data stored in one physical block is erased at once.

Each physical block includes a plurality of pages. Each page is a minimum unit in which program of data and read of data are executed.

The memory cell array 23 may be divided into a plurality of areas (planes) each including a plurality of physical blocks. The plurality of areas can be programmed, read, or erased simultaneously since each of the plurality of areas includes peripheral circuits (for example, a row decoder and a column decoder, and the like) that are independent from each other.

Also, one logical block may be configured with a plurality of physical blocks belonging to different memory chips 21 or different planes, respectively. The memory controller 10 configured with a plurality of logical blocks may execute programming, reading, or erasing at the same time for a plurality of physical blocks that configure each logical block.

Hereinafter, a block will be referred to as a physical block or a logical block.

FIG. 1 will be described again. The memory controller 10 includes a host interface (Host I/F) 11, a processor 12, a compression-decompression engine 13, a flash interface (Flash I/F) 14, a first Random Access Memory (RAM) 15, a second RAM 16, and a bus 17. In the memory controller 10, the host I/F 11, the processor 12, the compression-decompression engine 13, the Flash I/F 14, the first RAM 15, and the second RAM 16 are electrically connected to the bus 17.

The memory controller 10 may be configured as a System-On-a-Chip (SoC). The memory controller 10 may be configured with a plurality of chips. One or both of the first RAM 15 and the second RAM 16 may be configured as a chip different from the memory controller 10.

The host I/F 11 controls communication with the host 2. The host I/F 11 receives an access command from the host 2.

The flash I/F 14 transmits and receives data to and from the NAND memory 20.

The flash I/F 14 includes an Error Checking and Correction circuit (ECC) 18. The ECC 18 can execute encoding for error correction on data to be sent to the NAND memory 20, that is, data programmed in the memory cell array 23. In addition, the ECC 18 can execute decoding for error correction on the data read from the NAND memory 20.

Any encoding method may be adopted as the encoding method of the ECC 18. For example, a method capable of changing a code rate, such as a Low-Density Parity-Check code (LDPC), may be adopted as an encoding method for error correction by the ECC 18. The code rate is a rate of a data size before encoding to a data size after encoding. The smaller the code rate is, the stronger error correction capability is. An encoding method in which the code rate is fixed may be adopted as the encoding method of the ECC 18.

The processor 12 is, for example, a Central Processing Unit (CPU). The processor 12 executes a firmware program to control the entire memory controller 10. The firmware program is stored in advance in a nonvolatile memory such as the NAND memory 20, for example, and the processor 12 executes the firmware program. The processor 12 may use, as a work area, a volatile memory such as the first RAM 15.

Some or all functions of the control to be executed by the processor 12 may be implemented by a Field Programmable Gate Array (FPGA), an Application Specific Integrated Circuit (ASIC), or any logic circuit. In addition, the processor 12 may execute encoding or decoding for the error correction.

The first RAM 15 is a volatile memory in which management information is stored. The processor 12 can use the management information stored in the first RAM 15. The term "use" means referencing and updating.

As the volatile memory in which the management information is stored, any type of volatile memory may be adopted. For example, a Static Random Access Memory (SRAM), a Dynamic Random Access Memory (DRAM), or a combination thereof may be employed as a volatile memory in which the management information is stored.

Figure 3:
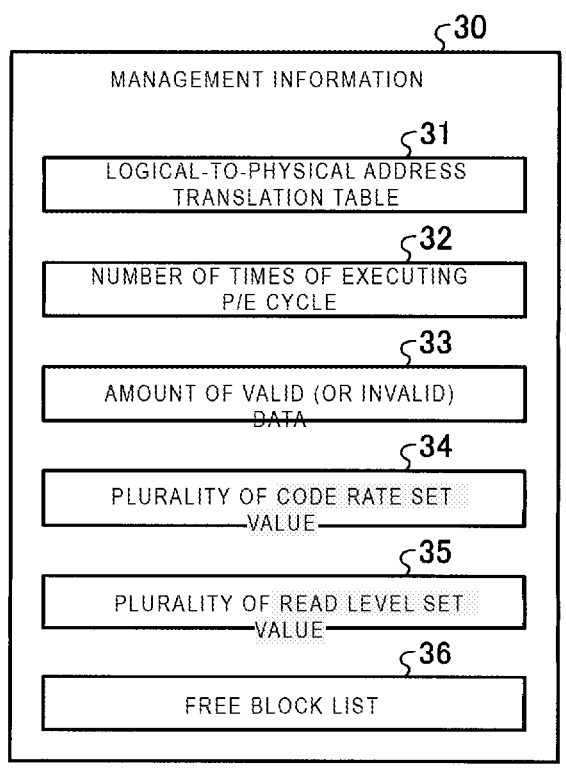
FIG. 3 is a schematic diagram showing an example of management information according to a first embodiment.

FIG. 3 is a schematic diagram showing an example of management information according to the first embodiment. As shown in the figure, management information 30 may include, for example, a logical-to-physical address translation table 31. The logical-to-physical address translation table 31 is information in which a correspondence relationship between a logical address and a physical address indicating a position in the NAND memory 20 is recorded. A configuration example of the logical-to-physical address translation table 31 will be described later.

In addition, the management information 30 may include the number of times of executing a program (P) and erase (E) cycle 32 counted for each block, other than the logical-to-physical address translation table 31. Wear of the memory cell proceeds in accordance with the number of times of executing the program and erase cycle. The memory controller 10 controls the number of times of executing the P/E cycle as uniform as possible between blocks so that some of the blocks do not protrude and is not worn. The control may be referred to as wear leveling. The memory controller 10 can use the number of times of executing P/E cycle 32 stored as the management information 30 for wear leveling.

The management information 30 may include an amount of valid (or invalid) data 33 counted for each block.

For example, when second user data is transmitted from the host 2 by designating the same logical address as first user data in a state where the first user data is stored in the NAND memory 20, the memory controller 10 programs the second user data in a block having an empty page. Then, the memory controller 10 manages the first user data already stored in the NAND memory 20 as invalid user data. The "empty" state refers to a state in which neither invalid data nor valid data is stored.

Invalid user data and valid user data are stored in each block since the program for the NAND memory 20 is performed by such a method. The data is valid means that the data is in the latest state. When a plurality of pieces of user data having the same logical address are stored in the NAND memory 20, the latest state refers to the state of the user data transmitted to the memory system 1 last by the host 2 among the plurality of pieces of user data. The invalid data is a piece of user data other than the user data transmitted to the memory system 1 last by the host 2 among the plurality of user data.

The memory controller 10 can execute garbage collection (compaction) based on the amount of valid (or invalid) data 33 counted for each block.

The garbage collection is a process of copying valid data to another block (referred to as a second block) among the data stored in a certain block (referred to as a first block), and then deeming all pieces of data stored in the first block as invalid. By the garbage collection, the first block becomes a free block.

The memory controller 10 can select a block having a small amount of valid data stored (in other words, a block having a large amount of invalid data stored) as a block to be an object of garbage collection, that is, a block as a copy source of valid data, based on the amount of valid (or invalid) data 33 recorded for each block as the management information 30. The efficiency of garbage collection can be improved by selecting a block having a small amount of valid (or invalid) data stored therein as a target of garbage collection.

After erasing is executed, the free block is in a state in which new data can be programmed.

The management information 30 may include a plurality of code rate set value 34 for each block. A threshold voltage of the memory cell easily varies in accordance with a progress of wear of the memory cell. That is, a bit error is likely to occur. Therefore, when an encoding method with a variable code rate (for example, an LDPC) is adopted, the memory controller 10 may reduce the code rate in accordance with an increase in the number of times of executing the P/E cycle. That is, the memory controller 10 enhances the error correction capability in accordance with the progress of wear of the memory cell. The memory controller 10 determines the code rate in accordance with the number of times of executing the P/E cycle for each block, and stores the code rate set value 34 for each block as the management information 30. The ECC 18 executes encoding by applying the code rate set value 34 for each block.

The method of setting the code rate is not limited to the above. In addition, granularity of management of the code rate may not be in unit of blocks. For example, the code rate may be managed in unit of physical pages.

In addition, the management information 30 may include a plurality of read level set value 35 for each block.

The threshold voltage of the memory cell is set to a state corresponding to data among a plurality of states at the time of programming the data. Data corresponding to a state to which the threshold voltage belongs is acquired by comparing a voltage value corresponding to a boundary of the state with the threshold voltage when data is read. The read level is a voltage value to be compared with the threshold voltage.

Here, the threshold voltage may vary due to various factors. When the threshold voltage varied as the error correction by the ECC 18 becomes difficult, the read level is changed to re-execute reading. The process of changing the read level and re-executing the read may be referred to as retry read.

When the retry read was executed, the memory controller 10 can store a read level set value after changing as the management information 30. When the read is performed again, the memory controller 10 can acquire the data without performing retry read again by using the read level set value 35 stored as the management information 30.

The granularity of the management of the read level may not be in unit of blocks. For example, the read level may be managed in unit of physical pages.

The management information 30 may include a free block list 36. The memory controller 10 can select, from the free block list 36, a block to which user data is to be written and a block to which valid data is to be moved in garbage collection.

The information included in the management information 30 is not limited to the information described above. The management information 30 may include any type of information instead of some or all of the information described above.

As described above, the first RAM 15 is a volatile memory. Therefore, when supply of power to the first RAM 15 is cut off, the management information 30 stored in the first RAM 15 is lost from the first RAM 15. The memory controller 10 writes the management information 30 stored in the first RAM 15 to the NAND memory 20 at a predetermined timing so that the management information 30 is not lost from the memory system 1 even if the supply of power to the first RAM 15 is cut off due to power-off and the like. As a result, the nonvolatile operation is completed.

The wear of the NAND memory 20 progresses in accordance with the number of times of executing the P/E cycle. The number of times of executing the P/E cycle correlates with the amount of data to be written into the NAND memory 20. That is, wear of the NAND memory 20 progresses as the amount of data written to the NAND memory 20 increases.

Therefore, if the amount of management information 30 written to the NAND memory 20 can be reduced, the total amount of data actually written to the NAND memory can be reduced without changing the amount of user data written to the NAND memory 20. In other words, WAF can be reduced. As a result, progressing speed of wear of the NAND memory 20 can be reduced.

In the present embodiment, the management information 30 in the first RAM 15 is compressed and then stored in the NAND memory 20. As a result, the amount (size) of the management information 30 written into the NAND memory 20 is reduced and the WAF is reduced.

All of the management information 30 may not necessarily be compressed. Some of the management information 30 may be compressed and stored in the NAND memory 20, and the other part of the management information 30 may be stored in the NAND memory 20 without being compressed.

In the first embodiment, it is described as an example that the management information 30 includes a logical-to-physical address translation table, and the logical-to-physical address translation table is compressed. Hereinafter, storing the management information 30 in the NAND memory 20 with or without compressing the management information 30 in the first RAM 15 may be described as non-volatilizing the management information 30.

Referring again to FIG. 1, the compression-decompression engine 13 is a circuit that executes compression-decompression of the management information 30. The compression-decompression engine 13 is an example of a compressor, and is also an example of a decompressor. The compression-decompression engine 13 may be configured with a total of two circuits including a circuit (corresponding to a compressor) that executes compression and a circuit (corresponding to a decompressor) that executes decompression.

Any algorithm may be adopted as an algorithm of compression (and decompression) by the compression-decompression engine 13 as long as the compression is reversible. For example, the compression-decompression engine 13 can perform differential encoding, dictionary encoding, Huffman encoding, and the like.

The second RAM 16 is a volatile memory in which the management information 30 in a compressed state is temporarily stored. The compression-decompression engine 13 compresses the management information 30 stored in the first RAM 15, and stores the compressed management information 30 in the second RAM 16. The management information 30 in a compressed state stored in the second RAM 16 is stored in the NAND memory 20 by the flash I/F 14.

In addition, the second RAM 16 stores the management information 30 in a compressed state read from the NAND memory 20. The compression-decompression engine 13 decompresses the management information 30 in a compressed state stored in the second RAM 16, and stores the restored management information 30 in the first RAM 15.

Any type of volatile memory may be adopted as the volatile memory in which the management information 30 in a compressed state is temporarily stored. For example, SRAM, DRAM, or a combination thereof may be employed as the volatile memory in which the management information 30 in a compressed state is temporarily stored.

Figure 4:
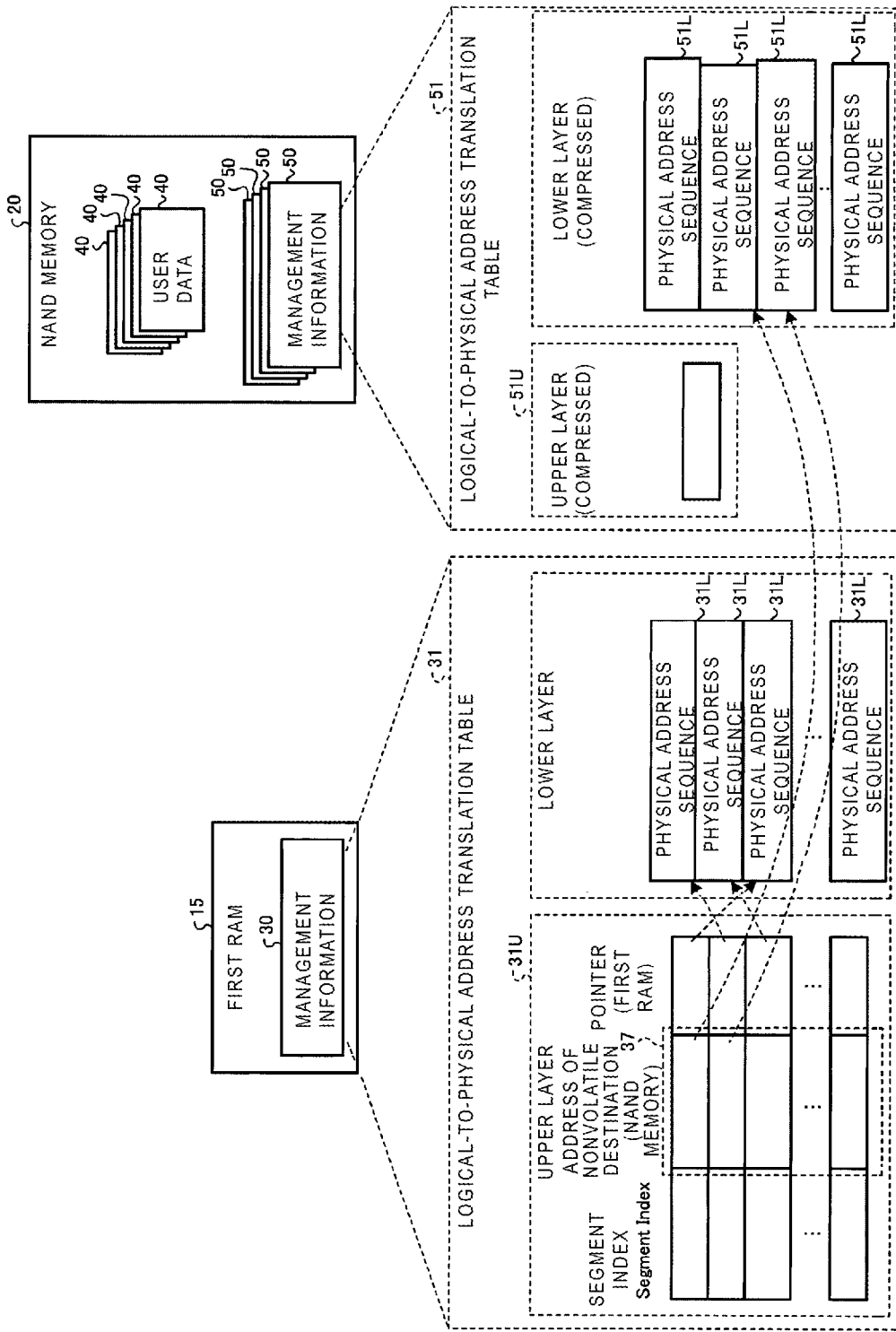
FIG. 4 is a schematic diagram showing a configuration of a logical-to-physical address translation table (logical-physical translation table) according to the first embodiment.

FIG. 4 is a schematic diagram showing a configuration of the logical-to-physical address translation table according to the first embodiment.

The logical-to-physical address translation table 31 included in the management information 30 in the first RAM 15 is hierarchized into two hierarchies, which are, an upper layer table 31U and a group of lower layer tables 31L. In the embodiment, the logical address space is divided into predetermined sizes, and the logical-to-physical address translation table 31 includes one table 31L for each sub-space generated by the division. The sub-space is referred to as a segment in the present specification.

In each table 31L, physical addresses respectively corresponding to a plurality of consecutive logical addresses in a corresponding segment are recorded in an order of logical address. That is, each table 31L has a data structure of a lookup table in which a physical address sequence is recorded.

The table 31U shows a corresponding relationship between the segment and the position of the table 31L. Specifically, the table 31U includes three fields.

A segment index, that is, identification information of the segment, is recorded in a first field. For example, when the sub-space configured with areas indicated by consecutive 64 logical addresses, the identification information of the segment is obtained by shifting a certain logical address in the segment to the right for six times.

A pointer indicating a position of the table 31L stored in the first RAM 15 is recorded in a third field. Accordingly, the segment and the table 31L are associated with each other.

A physical address indicating the position of the table 31L (table 51L) in the NAND memory 20 is recorded in a second field. When nonvolatile processing of a certain table 31L is executed, a physical address indicating a position where the table 31L (the table 51L) in the compressed state is written by the nonvolatile processing, is overwritten.

The first field may be omitted since an offset from beginning of the table 31U to each entry corresponds to the segment index of each entry statically when each entry of the table 31U is arranged in an order of segment index.

Any number of pieces of management information 50 is stored in the NAND memory 20. Each piece of the management information 50 is management information 30 that is non-volatilized at different timings.

The management information 50 includes a logical-to-physical address translation table 51. The logical-to-physical address translation table 51 includes a table 51U, which is the table 31U in the compressed state, and respective tables 51L, each of which is the table 31L in the compressed state. Since the table 31U and each table 31L are non-volatilized in a compressed state, the amount of data to be written into the NAND memory 20 is reduced due to the nonvolatile processing as compared with a case where the table 31U and each table 31L are non-volatilized in an uncompressed state. That is, WAF can be reduced.

The information of the first field of the table 31U is not necessary when each entry of the table 31U is arranged in an order of the segment index. In addition, when the supply of power to the first RAM 15 is cut off, such as power-off, the contents of the first RAM 15 are lost, and therefore, the information of the third field of the table 31U is also not necessary in the nonvolatile processing assuming that power is off. Therefore, it is assumed here that the table 51U is obtained by compressing only the contents of the second field of the table 31U (a part of a reference numeral 37).

Next, the operation of the memory system 1 of the first embodiment will be described.

When the power is turned on, that is, when supply of power to the memory system 1 is started, the memory system 1 restores the management information 30 in the first RAM 15 based on the management information 50 stored in the NAND memory 20 in the end.

Figure 5:
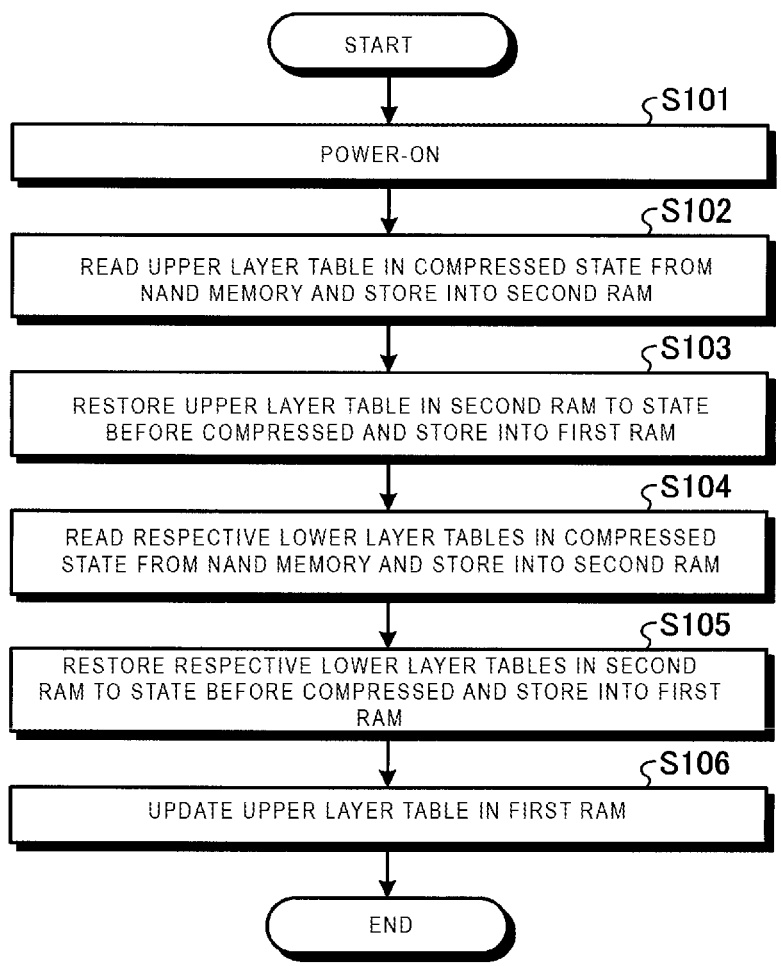
FIG. 5 is a flowchart showing an example of an operation of restoring the management information, which is executed by the memory system according to the first embodiment.

FIG. 5 is a flowchart showing an example of an operation of restoring the management information 30, which is executed by the memory system 1 according to the first embodiment. Here, an operation of restoring the logical-to-physical address translation table 31 as an example of the management information 30 will be described.

First, when power-on is performed (S101), power supply to each component of the memory system 1 is started. Then, the processor 12 controls the flash I/F 14 to read the table 51U in the NAND memory 20 and store the table 51U into the second RAM 16 (S102). Subsequently, the processor 12 controls the compression-decompression engine 13 to store, into the first RAM 15, the table 31U which was obtained by decompressing the table 51U in the second RAM 16 so as to be restored to the state before compression (S103).

Then, the processor 12 controls the flash I/F 14 to read each table 51L in the NAND memory 20 and store the table 51L into the second RAM 16 (S104). In a processing of S104, the processor 12 can specify the position of each table 51L in the NAND memory 20 by referring to the second field of the table 31U stored in the first RAM 15 in the processing of S103. Then, the processor 12 notifies the flash I/F 14 of the specified position as a read source of the corresponding table 51L.

Subsequently, the processor 12 controls the compression-decompression engine 13 to store, in the first RAM 15, the table 31L which was obtained by decompressing the table 51L in the second RAM 16 so as to be restored to the state before compression (S105).

In general, the size of a group of tables in a lower layer (for example, a group of tables 31L) tends to be very large. Therefore, in some cases, all the tables 51L cannot be stored at a time in the second RAM 16. In such a case, the processor 12 may perform S104 and S105 for the tables 51L.

When the storage destination in the first RAM 15 of the table 31L is determined, the processor 12 records, in the third field of the corresponding entry, a pointer indicating the storage destination in the first RAM 15 of the table 31L (S106).

The determination of the storage destination in the first RAM 15 of the table 31L may be before execution of S104 or S105. For example, the processor 12 may determine the storage destination in the first RAM 15 of the table 31L, and then store the table 31L in the storage destination. Therefore, S106 may be executed prior to S104 or S105.

The operation of restoring the logical-to-physical address translation table 31 ends when the processing of S104 to S106 is completed for all the tables 51L.

The operation of restoring the logical-to-physical address translation table 31 as an example of the management information 30 was described in this example. When some or all of the number of times of executing P/E cycle 32, the amount of valid (or invalid) data 33, the code rate set value 34, the read level set value 35, and the free block list 36 are compressed and non-volatilized by the compression-decompression engine 13, the processor 12 can decompress information stored in the NAND memory 20 in a compressed state by the compression-decompression engine 13, and store the information obtained by decompression into the first RAM 15.

The processor 12 can use the management information (in particular, the logical-to-physical address translation table 31) restored to the first RAM 15. That is, for example, when the processor 12 receives a read command, the processor 12 refers to the logical-to-physical address translation table 31 restored to the first RAM 15 for a physical address corresponding to a logical address included in the read command. In addition, when the user data requested to be written by the write command is written in the NAND memory 20, the processor 12 associates a logical address indicating the position of the user data with a physical address indicating the write destination of the user data by updating the logical-to-physical address translation table 31 restored to the first RAM 15.

When the management information 30 (for example, the logical-to-physical address translation table 31) in the first RAM 15 is updated, the management information 30 is required to be non-volatilized. This is because the contents of the management information 30 in the first RAM 15 and the contents of the latest non-volatilized management information 30 are different.

Figure 6:
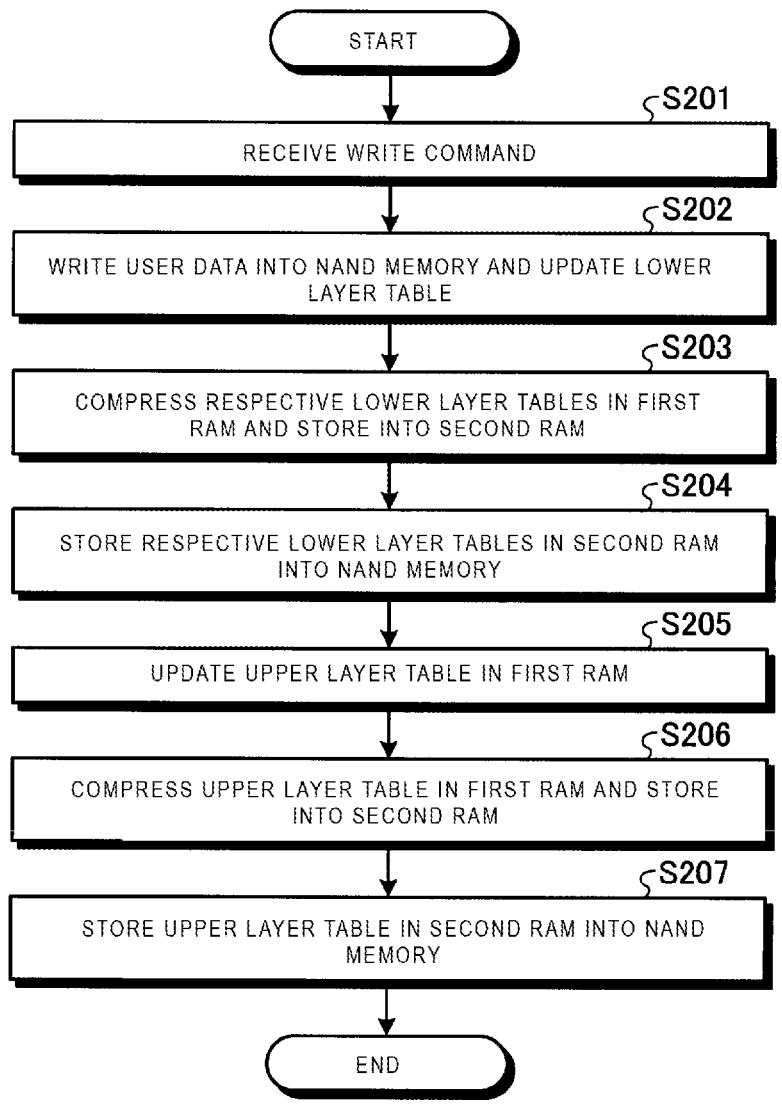
FIG. 6 is a flowchart showing an example of an operation to non-volatilize the management information, which is executed by the memory system according to the first embodiment.

FIG. 6 is a flowchart showing an example of an operation to non-volatilize the management information 30, which is executed by the memory system 1 according to the first embodiment. Here, an operation of non-volatilizing the logical-to-physical address translation table 31 as an example of the management information 30 will be described.

When the memory controller 10 receives a write command from the host 2 (S201), the memory controller 10 executes processing corresponding to the write command. That is, the memory controller 10 writes the user data requested to be written by the write command into the NAND memory 20. When the write destination of the NAND memory 20 of the user data is determined, the processor 12 updates the logical-to-physical address translation table 31 in the first RAM 15 (S202). For example, the processor 12 overwrites a physical address associated with the logical address specified by the write command in the table 31L with the physical address of the write destination of the user data.

The timing at which the write destination of the NAND memory 20 of the user data is determined may be earlier than that when the user data is actually written into the NAND memory 20. That is, the update of the logical-to-physical address translation table 31 may be executed before the user data is written into the NAND memory 20.

Subsequently, the processor 12 controls the compression-decompression engine 13 to compress the respective tables 31L in the first RAM 15 and store the tables 31L in the compressed state into the second RAM 16 (S203). The processor 12 keeps respective tables 31L in an uncompressed state in the first RAM 15, and continues to use the respective tables 31L in the first RAM 15.

Subsequently, the processor 12 controls the flash I/F 14 to store the respective tables 31L in the compressed state in the second RAM 16 into the NAND memory 20 as the respective tables 51L (S204).

The processor 12 may perform the processing of S203 and S204 for every few tables 31L.

When the storage destination in the NAND memory 20 of the compressed state table 31L is determined, the processor 12 records (i.e., updates) the physical address indicating the destination in the NAND memory 20 of the table 31L in the second field of the corresponding entry of the table 31U (S205).

The timing at which the storage destination in the NAND memory 20 of the table 31L in the compressed state is determined may be earlier than S203 or S204.

When the processing of S205 is completed for all the tables 31L, the processor 12 controls the compression-decompression engine 13 to compress the table 31U in the first RAM 15 and store the table 31U in the compressed state into the second RAM 16 (S206). In S206, the processor 12 sets only the value of the second field as a compression target, for example. A compression target setting method is not limited to the above. For example, the processor 12 may set all of the table 31U as a compression target. The processor 12 keeps the table 31U in an uncompressed state in the first RAM 15, and continues to use the table 31U in the first RAM 15.

Subsequently, the processor 12 controls the flash I/F 14 to store the table 31U in the compressed state in the second RAM 16 into the NAND memory 20 as the table 51U (S207). As a result, the nonvolatile operation is completed.

Here, although all the tables 31L are set as targets of nonvolatile processing, only some of the tables 31L may be set as targets of nonvolatile processing. For example, if there is a table 31L that is never updated after restoration to the first RAM 15 or latest nonvolatile processing, the processing of S203 to S205 may not be executed for the table 31L.

In addition, although it has been described here that the nonvolatile processing of the logical-to-physical address translation table 31 is executed every time the processing of the write command is executed, the timing of the nonvolatile processing of the logical-to-physical address translation table 31 is not limited to every time the processing of the write command is executed. For example, the nonvolatile processing of the logical-to-physical address translation table 31 may be executed every time the processing of a predetermined number of write commands is executed. In addition, the nonvolatile processing of the logical-to-physical address translation table 31 may be executed at a predetermined time interval. In addition, the nonvolatile processing of the logical-to-physical address translation table 31 may be executed every time the number of the tables 31L that was updated after the restoration or latest nonvolatile processing reaches a predetermined number.

In addition, in the memory controller 10, other than the logical-to-physical address translation table 31 described above, some or all of the number of times executing P/E cycle 32, the amount of valid (or invalid) data 33, the code rate set value 34, the read level set value 35, and the free block list 36 may be compressed and non-volatilized by the compression-decompression engine 13. As described above, when information stored in the NAND memory 20 in a compressed state is to be restored, the memory controller 10 decompresses the information by the compression-decompression engine 13 and stores the information obtained by decompression into the first RAM 15.

As described above, according to the first embodiment, the memory controller 10 compresses the management information 30 stored in the first RAM 15 by the compression-decompression engine 13 serving as a compressor, and stores the management information 30 in the compressed state into the NAND memory 20.

As a result, WAF can be reduced as compared with the case where the management information 30 is non-volatilized without being compressed.

Further, the memory controller 10 reads the management information 50 stored in the NAND memory 20, decompresses the management information 50 by the compression-decompression engine 13 serving as a decompressor, and stores, into the first RAM 15, the management information 30 that is the management information 50 in a decompressed state, that is, a restored state.

As a result, the management information 30 that is non-volatilized and in the compressed state can be restored to a usable state.

In addition, the management information 30 is, for example, a logical-to-physical address translation table 31 that is hierarchized into an upper layer table 31U and lower layer tables 31L. The memory controller 10 compresses the table 31L, stores the compressed table into the NAND memory 20, and records the storage destination in the NAND memory 20 into the table 31U. After recording, the memory controller 10 compresses the table 31U and stores the compressed table into the NAND memory 20.

Therefore, even when the logical-to-physical address translation table 31, which is the management information 30, is hierarchized into a plurality of hierarchies, the logical-to-physical address translation table 31 can be compressed and non-volatilized.

In the example described above, a case in which the logical-to-physical address translation table 31 is hierarchized into two hierarchies: an upper layer and a lower layer was described. The logical-to-physical address translation table 31 may be hierarchized into three or more hierarchies. In that case, the compression and the nonvolatile processing are sequentially executed from the table of the lowest hierarchy.

In addition, the memory controller 10 may have different parameters or compression algorithms for compression between the table 31U and each table 31L.

Figure 7:
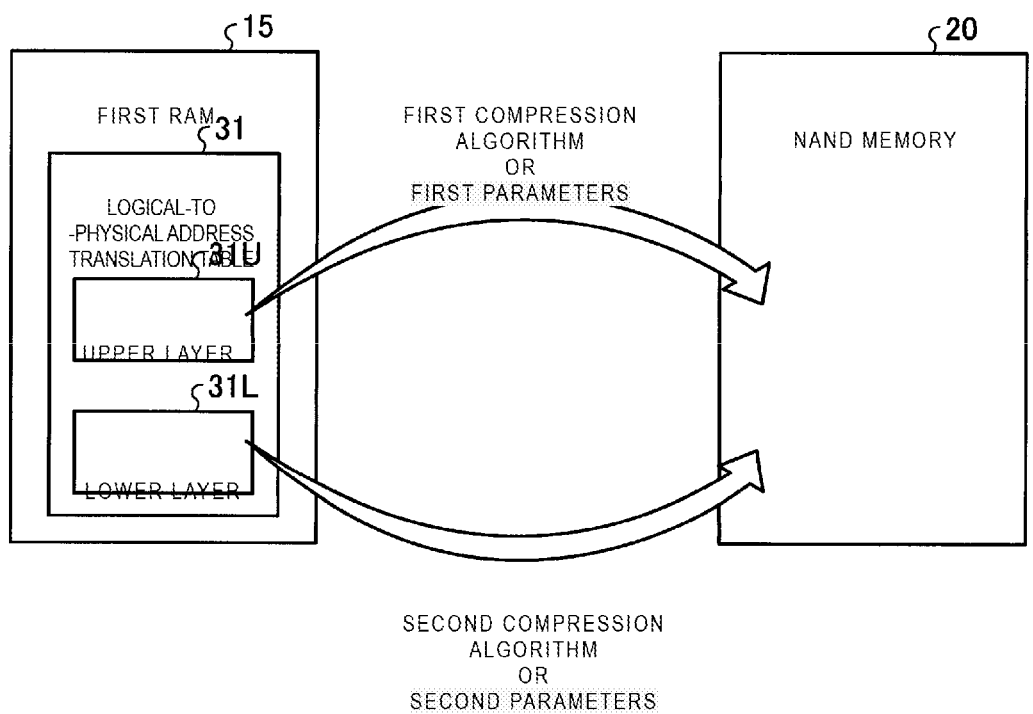
FIG. 7 is a schematic diagram showing an example of a configuration in which a compression algorithm or plurality of parameters for compression of the memory system according to the first embodiment are different between an upper layer and a lower layer.

FIG. 7 is a schematic diagram showing an example of a configuration in which a compression algorithm or a plurality parameters for compression of the memory system 1 according to the first embodiment are different between an upper layer and a lower layer. As shown in this figure, when the table 31U is non-volatilized, the memory controller 10 compresses the table 31U by using a first compression algorithm or first parameters by controlling the compression-decompression engine 13. In addition, when the table 31L is non-volatilized, the memory controller 10 compresses the table 31L by using a second compression algorithm or second parameters by controlling the compression-decompression engine 13.

The first compression algorithm and the second compression algorithm are different from each other. In one example, the first compression algorithm is a dictionary encoding and the second compression algorithm is a differential encoding.

The first parameters and the second parameters are different from each other. For example, when differential encoding is employed as the compression algorithm, an encoding table of the difference value corresponds to the parameter described here. The first parameters and the second parameters are not limited to the encoding table of the difference value.

Second Embodiment

The group of lower layer tables has a larger size than the upper layer table. Therefore, a large-capacity volatile memory is required when storing a group of lower layer tables in a volatile memory. Therefore, an operation is considerable in which the logical-to-physical address translation table is used in a state that among the logical-to-physical address translation table, the upper layer table is stored in the volatile memory, and the group of lower layer tables is stored in the NAND memory in order to reduce the capacity of the volatile memory.

In the second embodiment, a case will be described in which the group of lower layer tables is used in a state of being stored in a NAND memory. Differences from the first embodiment will be described in the second embodiment. A description will be simplified or a description will be omitted for the same point as the first embodiment.

Figure 8:
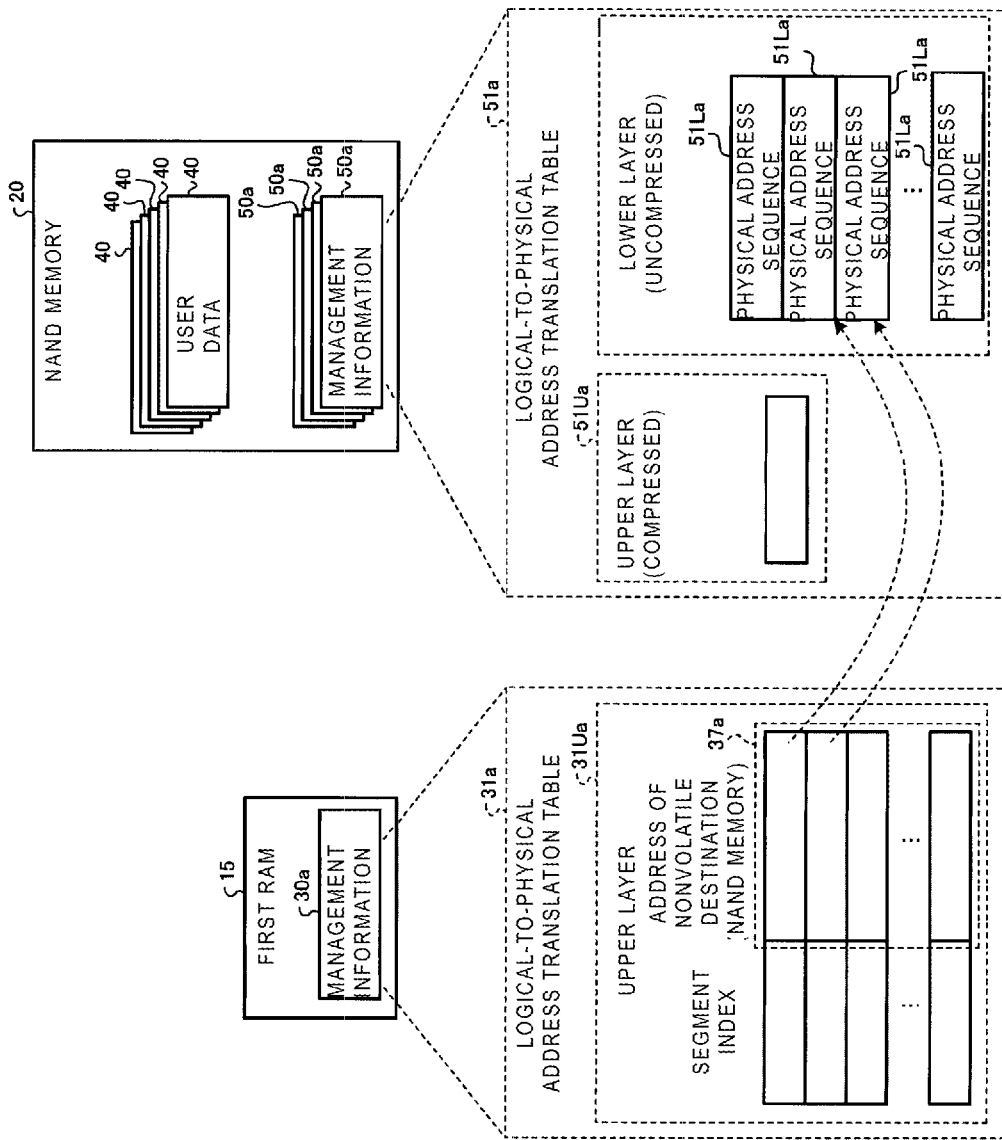
FIG. 8 is a schematic diagram showing a configuration of a logical-to-physical address translation table according to a second embodiment.

FIG. 8 is a schematic diagram showing a configuration of a logical-to-physical address translation table according to the second embodiment.

As shown in FIG. 8, the first RAM 15 stores management information 30a including a logical-to-physical address translation table 31a. The logical-to-physical address translation table 31a is configured with only an upper layer table 31Ua. The table 31Ua has a configuration in which the third field is eliminated from the table 31U of the first embodiment. That is, the table 31Ua includes a first field in which a segment index is recorded and a second field in which an address of a nonvolatile destination is recorded.

Further, any number of pieces of management information 50a is stored in the NAND memory 20. Each piece of the management information 50a is the management information 30a that is non-volatilized at different timings.

The management information 50a includes a logical-to-physical address translation table 51a. The logical-to-physical address translation table 51a includes a table 51Ua which is the table 31Ua in a compressed state and respective tables 51La in a lower layer in an uncompressed state. In the second embodiment, since the table 31Ua is non-volatilized in a compressed state, the amount of data to be written into the NAND memory 20 is reduced due to the nonvolatile processing as compared with a case where the table 31Ua is non-volatilized in an uncompressed state. That is, WAF can be reduced.

Figure 9:
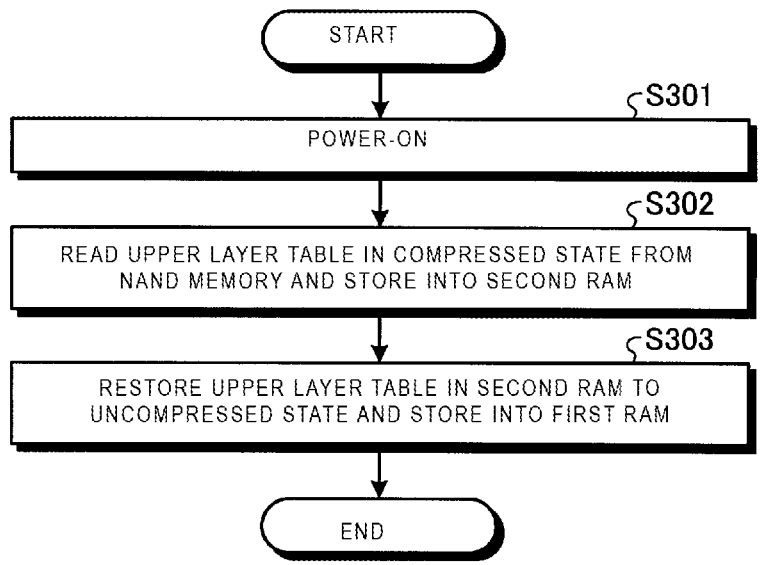
FIG. 9 is a flowchart showing an example of an operation of restoring management information, which is executed by a memory system according to the second embodiment.

FIG. 9 is a flowchart showing an example of an operation of restoring management information 30a, which is executed by a memory system 1 according to the second embodiment. Here, a case where the logical-to-physical address translation table 31a as an example of the management information 30a is a restoration target will be described.

First, when power-on is performed (S301), power supply to each component of the memory system 1 is started. Then, the processor 12 controls the flash I/F 14 to read the table 51Ua in the NAND memory 20 and store the table 51Ua into the second RAM 16 (S302). Subsequently, the processor 12 controls the compression-decompression engine 13 to store, into the first RAM 15, the table 31Ua which was obtained by decompressing the table 51Ua in the second RAM 16 so as to be restored to the state before compression (S303). As a result, the operation of restoring management information 30a is completed.

As in the first embodiment, when information other than the logical-to-physical address translation table 31a in the management information 30a is to be non-volatilized in a compressed state, the information may be decompressed by the compression-decompression engine 13 and stored into the first RAM 15.

The processor 12 may use the management information 30a restored to the first RAM 15.

For example, when the processor 12 receives a read command, the processor 12 refers to the logical-to-physical address translation table 31a restored to the first RAM 15, that is, the table 31Ua for a physical address corresponding to a logical address included in the read command. Then, the processor 12 refers to a table 31La stored in the nonvolatile destination address indicated by the table 31Ua.

In addition, the processor 12 updates a corresponding table 31La when the user data requested to be written by the write command is written in the NAND memory 20. Specifically, the processor 12 loads the table 31La into a volatile memory such as the first RAM 15, updates the read table 31La, and writes the updated table 31La into the NAND memory 20. Then, the processor 12 updates the table 31Ua in the first RAM 15 in accordance with the updated table 31La stored at a position different from an original position thereof.

When the management information 30a (for example, the table 31Ua) in the first RAM 15 was updated, the management information 30a is required to be non-volatilized.

Figure 10:
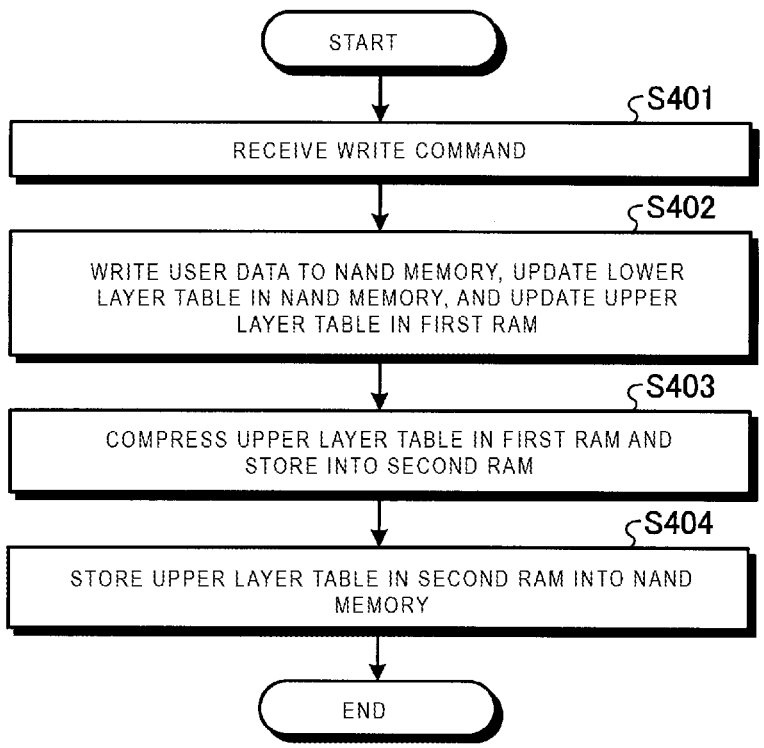
FIG. 10 is a flowchart showing an example of an operation to non-volatilize the management information, which is executed by the memory system according to the second embodiment.

FIG. 10 is a flowchart showing an example of an operation to non-volatilize the management information 30a, which is executed by the memory system 1 according to the second embodiment. Here, a case where the logical-to-physical address translation table 31a as an example of the management information 30a is a target of nonvolatile processing will be described.

When the memory controller 10 receives the write command from the host 2 (S401), the memory controller 10 executes processing corresponding to the write command. That is, the memory controller 10 writes the user data requested to be written by the write command into the NAND memory 20. When the write destination in the NAND memory 20 of the user data is determined, the processor 12 updates a corresponding table 31La in the NAND memory 20 and the table 31Ua in the first RAM 15 (S402). The processor 12 records the updated position of the table 31La in the table 31Ua when the processor 12 updates the table 31La in the NAND memory 20.

The timing at which the write destination in the NAND memory 20 of the user data is determined may be earlier than that when the user data is actually written into the NAND memory 20. That is, the update of various types of table (table 31La, or the table 31Ua) may be executed before the user data is written into the NAND memory 20.

Subsequently, the processor 12 controls the compression-decompression engine 13 to compress the table 31Ua in the first RAM 15 and store the table 31Ua in the compressed state into the second RAM 16 (S403). The processor 12 keeps the table 31Ua in an uncompressed state in the first RAM 15, and continues to use the table 31Ua in the first RAM 15.

Subsequently, the processor 12 controls the flash I/F 14 to store the table 31Ua in the compressed state in the second RAM 16 into the NAND memory 20 as the table 51Ua (S404). As a result, the nonvolatile operation according to the second embodiment is completed.

Similarly with the first embodiment, the timing of the nonvolatile processing of the table 31Ua is not limited to the above, and may be any timing. In addition, in the memory controller 10, other than the logical-to-physical address translation table 31a described above, some or all of the number of times of executing P/E cycle 32, the amount of valid (or invalid) data 33, the code rate set value 34, the read level set value 35, and the free block list 36 may be compressed and non-volatilized by the compression-decompression engine 13.

As described above, according to the second embodiment, the memory controller 10 uses the logical-to-physical address translation tables 31a and 51a in a state where the upper layer table 31Ua is stored in the first RAM 15 and the lower layer table 31La is stored in the NAND memory 20. Then, the memory controller 10 compresses the table 31Ua and non-volatilize.

As described above, even when the memory controller 10 is configured to store only the table of a specific hierarchy in the logical-to-physical address translation table into the volatile memory, the memory controller 10 can compress the table of the specific hierarchy when nonvolatile processing of the table of the specific hierarchy is executed. As a result, WAF can be reduced as compared with a case where a table of any hierarchy is non-volatilized without being compressed.

Third Embodiment

In the third embodiment, an example in which only a group of tables in a lower layer is compressed and is non-volatilized will be described. In the third embodiment, differences from the first embodiment will be described. A description will be simplified or a description will be omitted for the same point as the first embodiment.

Figure 11:
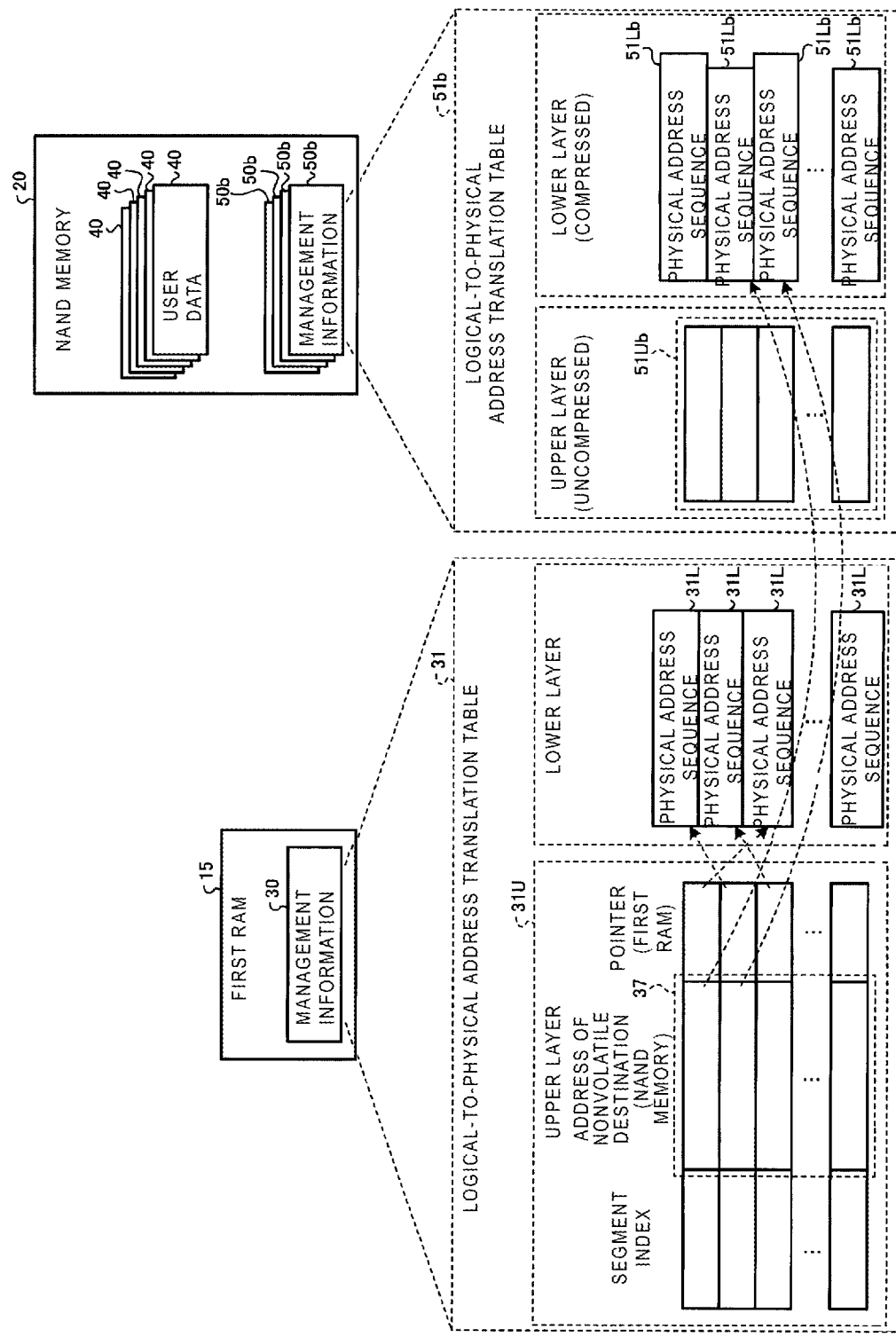
FIG. 11 is a schematic diagram showing a configuration of a logical-to-physical address translation table according to a third embodiment.

FIG. 11 is a schematic diagram showing a configuration of a logical-to-physical address translation table according to the third embodiment.

As shown in FIG. 11, the first RAM 15 stores management information 30 including a logical-to-physical address translation table 31. The logical-to-physical address translation table 31 has a similar configuration as in the first embodiment.

Further, any number of pieces of management information 50b is stored in the NAND memory 20. Each piece of the management information 50b is the management information 30 that is non-volatilized at different timings.

The management information 50b includes a logical-to-physical address translation table 51b. The logical-to-physical address translation table 51b includes a table 51Ub which is a table 31U in an uncompressed state and respective tables 51Lb in a lower layer in a compressed state. In the third embodiment, since the respective tables 31L are non-volatilized in a compressed state, the amount of data to be written into the NAND memory 20 is reduced due to the nonvolatile processing as compared with a case where the respective tables 31L are non-volatilized in an uncompressed state. That is, WAF can be reduced.

Figure 12:
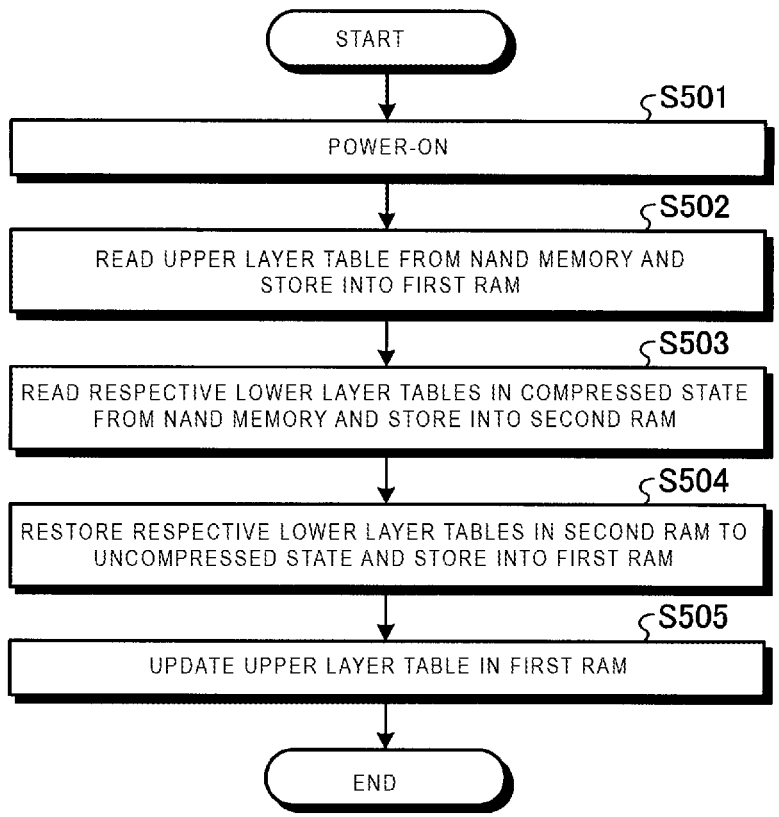
FIG. 12 is a flowchart showing an example of an operation of restoring management information, which is executed by a memory system according to the third embodiment.

FIG. 12 is a flowchart showing an example of an operation of restoring management information 30, which is executed by a memory system 1 according to the third embodiment. Here, a case where the logical-to-physical address translation table 31 as an example of the management information 30 is a restoration target will be described.

First, when power-on is performed (S501), power supply to each component of the memory system 1 is started. Then, the processor 12 controls the flash I/F 14 to read the table 51Ub in the NAND memory 20 and store the table 51Ub into the first RAM 15 (S502).

Subsequently, the processor 12 controls the flash I/F 14 to read the respective tables 51Lb in the NAND memory 20 and store the tables 51Lb in the second RAM 16 (S503). In processing of S503, the processor 12 can specify the position of each table 51L in the NAND memory 20 by referring to a second field of the table 31U stored in the first RAM 15 in the processing of S502. The processor 12 notifies the flash I/F 14 of the specified position as a read source of a corresponding table 51Lb.

Subsequently, the processor 12 controls the compression-decompression engine 13 to store, into the first RAM 15, the table 31L which was obtained by decompressing the table 51Lb in the second RAM 16 so as to be restored to the state before compression (S504).

The processor 12 may perform the processing of S503 and S504 for every few tables 51Lb.

When the storage destination in the first RAM 15 of the table 31L is determined, the processor 12 records, in a third field of a corresponding entry, a pointer indicating a storage destination in the first RAM 15 of the table 31L (S505).

The determination of the storage destination in the first RAM 15 of the table 31L may be before execution of S503 or S504. Therefore, S505 may be executed prior to S503 or S504.

When the processing of S503 to S505 for all the tables 51Lb is completed, the operation of restoring the management information 30, particularly the logical-to-physical address translation table 31 ends.

As in the first embodiment, when information other than the logical-to-physical address translation table 31 in the management information 30 is to be compressed and non-volatilized, the information can be decompressed by the compression-decompression engine 13 and stored into the first RAM 15.

The processor 12 can use the management information 30 restored to the first RAM 15. Further, when the management information 30 (for example, the logical-to-physical address translation table 31) in the first RAM 15 is updated, the management information 30 is required to be non-volatilized.

FIG. 13 is a flowchart showing an example of an operation to non-volatilized the management information 30, which is executed by the memory system 1 according to the third embodiment. Here, a case where the logical-to-physical address translation table 31 as an example of the management information 30 is a target of nonvolatile processing will be described.

First, in S601 to S605, the same processing as that of S201 to S205 (see FIG. 6) of the first embodiment is executed.

When the processing of S605 for all the tables 31L is completed, the processor 12 controls the flash I/F 14 to store the table 31U in the first RAM 15 into the NAND memory 20 as the table 51Ub (S606). The processor 12 keeps the table 31U in an uncompressed state in the first RAM 15, and continues to use the table 31U in the first RAM 15.

According to S606, the nonvolatile operation according to the third embodiment is completed.

As in the first embodiment, a timing of nonvolatile processing of the logical-to-physical address translation table 31 is not limited to the above, and may be any timing. In addition, in the memory controller 10, other than the respective tables 31L, some or all of the number of times of executing P/E cycle 32, the amount of valid (or invalid) data 33, the code rate set value 34, the read level set value 35, and the free block list 36 may be compressed and non-volatilized by the compression-decompression engine 13.

As described above, according to the third embodiment, the memory controller 10 non-volatilizes the upper layer table 31U without compressing the table 31U, and compresses and non-volatilizes the lower layer table 31L.

As described above, even when the memory controller 10 is configured to store only a table of a specific hierarchy in the logical-to-physical address translation table into the volatile memory, the memory controller 10 can compress the table of the specific hierarchy when nonvolatile processing of the table of the specific hierarchy is executed. As a result, WAF can be reduced as compared with a case where a table of any hierarchy is non-volatilized without being compressed.

The memory controller 10 compresses the table 31L, stores the compressed table 31L into the NAND memory 20, and records a storage destination of the table 31L in the NAND memory 20 into the table 31U. Then, the memory controller 10 executes nonvolatile processing of the table 31U after recording the storage destination of the table 31L into the table 31U.

Therefore, when the logical-to-physical address translation table 31, which is the management information 30, is configured with a plurality of hierarchies, it is possible to compress and non-volatilized a part of the logical-to-physical address translation table 31.

As described in the first to third embodiments, the memory system of the embodiment includes an NAND memory 20 as a first memory which is nonvolatile, a first RAM 15 as a second memory which is volatile, a compression-decompression engine 13 as a compressor, and a memory controller 10. The memory controller 10 stores the management information 30 (management information 30a) in the first RAM 15, and uses the management information 30 (management information 30a) stored in the first RAM 15. The memory controller 10 compresses a part or all of the management information 30 (management information 30a) by the compression-decompression engine 13, and stores a part or all of the management information 30 (management information 30a) in the compressed state into the NAND memory 20.

As a result, the write amplification factor (WAF) can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a first memory that is nonvolatile;

a second memory that is volatile; and a memory controller configured to store first information in the second memory, wherein the first information includes a table including a first table of a first hierarchy and a second table of a second hierarchy, the second hierarchy being lower than the first hierarchy which causes the second table to be executed prior to the first table;

the second table includes a plurality of physical addresses, each of the physical address indicating a position in the first memory, each of the plurality of physical addresses being mapped to each of a plurality of consecutive logical addresses, each of a plurality of consecutive logical addresses being specified by a host, the first table includes a correspondence relationship between a storage position of the second table in the second memory and an identification information of a segment, the segment indicating the plurality of consecutive logical addresses, the segment including upper bits of the plurality of consecutive logical addresses; and the memory controller is configured to:
compress at least one of the first table and the second table, the at least one of compressed first table and second table being second information; and
store the second information in the first memory.

2. The memory system according to claim 1, wherein the memory controller is further configured to:
read the second information stored in the first memory;
decompress the read second information; and
store the decompressed second information in the second memory.

3. The memory system according to claim 1, wherein the memory controller is further configured to:
compress the second table and store the compressed second table in the first memory;
record a storage position of the compressed second table in the first memory in the first table; and
compress the first table, and store the compressed first table in the first memory.

4. The memory system according to claim 3, wherein the memory controller is configured to compress the second table using a plurality of second parameter different from a plurality of first parameter used to compress the first table.

5. The memory system according to claim 3, wherein the memory controller is configured to compress the second table using a second algorithm different from a first algorithm used to compress the first table.

6. The memory system according to claim 1, wherein the second table is stored in the first memory,
the memory controller is further configured to read and update the second table from the first memory.

7. The memory system according to claim 1, wherein the first table is stored in the second memory, and
the memory controller is further configured to compress the second table and store the compressed second table in the first memory, record a storage position of the second table in the first memory in the first table, and store the first table into the first memory without compressing the first table.

8. The memory system according to claim 1, wherein the first information includes at least one of the number of times of executing a program/erase cycle, an amount of valid or invalid data, a plurality of code rate set value, a plurality of read level set value, or a free block list.

9. The memory system according to claim 1, wherein the first table includes further a correspondence relationship between a storage position of the second table in the first memory and the identification information of the segment.

10. A method, comprising:
storing first information, which includes a table including a first table of a first hierarchy and a second table of a second hierarchy, the second hierarchy lower than the first hierarchy which causes the second table to be executed prior to the first table, wherein the second table includes a plurality of physical addresses, each of the physical address indicating a position in a nonvolatile memory, each of the plurality of physical addresses being mapped to each of a plurality of consecutive logical addresses, each of a plurality of consecutive logical addresses being specified by a host, and wherein the first table includes a correspondence relationship between a storage position of the second table in a volatile memory and an identification information of a segment, the segment indicating the plurality of consecutive logical addresses, the segment including upper bits of the plurality of consecutive logical addresses;
compressing, using a compressor, at least one of the first table and the second table, wherein the first table includes a correspondence relationship between a storage position of the physical address in the volatile memory and the logical address, and the second table includes the physical address corresponding to the logical address; and
storing, in a nonvolatile memory, second information that is the at least one of compressed first table and second table.

11. The method of claim 10, further comprising:
reading the second information stored in the nonvolatile memory;
decompressing the read second information using a decompressor; and
storing the decompressed second information in the volatile memory.

12. The method of claim 10, further comprising:
compressing the second table;
storing the compressed second table into the nonvolatile memory;
recording a storage position of the second table in the nonvolatile memory into the first table;
compressing the first table in which the storage position is recorded; and
storing the compressed first table into the first memory.

13. A memory system comprising:
a first memory that is nonvolatile;
a second memory that is volatile; and
a memory controller configured to control the first memory and the second memory, and to manage first information, wherein
the first information includes a table
including a first table of a first hierarchy and a second table of a second hierarchy, the second hierarchy being lower than the first hierarchy which causes the second table to be executed prior to the first table;
the second table includes a plurality of physical addresses, each of the physical address indicating a position in the first memory, each of the plurality of physical addresses being mapped to each of a plurality of consecutive logical addresses, each of a plurality of consecutive logical addresses being specified by a host,
the first table includes a correspondence relationship between a storage position of the second table in the second memory and an identification information of a segment, the segment indicating the plurality of consecutive logical addresses, the segment including upper bits of the plurality of consecutive logical addresses; and the memory controller is configured to:
 store the first table in the second memory;
 store the second table in the first memory; and
 compress the first table and store the compressed first table in the first memory.

\* \* \* \* \*